(12) United States Patent
Wings

(10) Patent No.: X8653
(45) Date of Patent: Feb. 20, 1835

(54) SPINDLE & BUSH, RING & BALL, FOR MILLS

(76) Inventor: Warren P. Wings

Warren P. Wing, of Greenwich Massachusetts

Letters Patent.

The Schedule referred to in these Letters Patent and making part of the same containing a description in the words of the said Warren P Wing himself of his improvement. "in the mode of constructing the Mill bush or Spindle box for Flour Mills. and also of making and fixing a ring and bale in the eye of the upper Stone.

To all whom it may concern. Be it known that I Warren P. Wing of Greenwich in the County of Hampshire and State of Massachusetts have invented certain improvements in the manner of fixing the mill Bush or Spindle box and of constructing a ring and bale to be fixed in the eyes of mill stones for the grinding of flour or other articles. and I do hereby declare that the following is a full and exact description thereof. I make a box usually of cast iron which I adapt in size to the eye of the Stone. For the sake of facility in description I will give the dimensions of one which I have made and which after a fair trial has been found to answer well in practice. The box has a top which fits on to it like a snuff box. It is ten inches in diameter and five inches in depth. the outer rim being three fourths of an inch in thickness. The bottom and top are both perforated in the centre so as to allow the mill spindle to pass through them. This box is to contain three bearing pieces of block tin or of any proper mixed metal which are to be simultaneously forced up against the spindle and which are in contact with it for about three fourths of its circumference. the remaining fourth being exposed to the cooling influence of the air. These metal bearings are cast into a follower of cast iron. a birds eye view of which resembles the letter H. the outer end of which receives the cam or excentric. by which the bearings are to be forced up against the Spindle Cells to receive these followers are formed with the box by six wings or cheeks extending from the top to the bottom. the sides of each of the three cells thus formed being parallel to each other, that the followers may slide readily and truly therein. these wings are of course cast with the box. The void spaces between them admit of the contact of air with the spindle, and one of them is to be used for another purpose
to be presently described. Between the rim of the box and the cross bars of each
of the followers. the bottom is perforated to allow the passage of round rods
of iron. the upper ends of which are formed into cams or eccentrics for forcing
up the followers, and for this purpose extend up through the whole depth
of the box. The lower ends of the above named round rods or spindles ex
tend down sufficiently below the bed stone. to allow of their being acted
upon conveniently. as they are all to turn at the same time. The turn
ing them simultaneously may be effected in various ways. but that which
I deem the most simple is by attaching each of the spindles to a ring by
means of a jointed crank so that when the ring is made to revolve. the
followers will all advance at the same time. other modes will occur to any
skilful Mechanician and need not therefore be specified. The cover of
the box I make somewhat convex. it need not be more than one fourth
of an inch in thickness. besides the perforation in its centre for the spindle
I usually drill or cast holes through it near the rim or edge which I
fill with wood in order to nail the elastic collar thereto. In order to
lubricate or oil the spindle I drill a hole through the bottom of the box
near the periphery. and in one of the angles formed by it and one of the
before named wings or checks in one of the void spaces, And extend
down through this hole in the manner of those attached to the eccentrics
and this carries a leaf within the box to which a sponge containing oil
or a lump of grease of any suitable kind may be attached. By turn
ing this rod the oil or grease is brought into contact with the spindle
and lubricates it, and this may be done in a moment as often as it
is found necessary. My improvement in the bale and ring consists
in casting them in one entire piece, in such way that the ring may be
let into and firmly affixed in the eye of the stone. The bale rises as
a semicircle above the ring. or forming such other curve between ~~two~~ op
posite points on the diameter of the ring as shall adapt it to the cast heads
of spindles already made. Gains or notches are made under the ends
of the bale in the ring to receive the driver. What I claim as my inven
tion is the construction of a spindle Box in which the followers are mo ed up by eccentrics or cams without the necessity of stopping the mill
and operating substantially in the manner described. I also claim the
arrangement for lubricating as herein described. and likewise the man
ner of constructing the ring and bale in one piece, as herein set forth
not however intending to confine myself to the exact forms which I have
described but to vary the same in any manner which I may think
proper whilst the like ends are obtained by means substantially the
the same Witnesses
Sam. [illegible]
D. S. Mitts.

Warren. P. Wing

Exd
W.G.C 10.08 words